(12) United States Patent
Schunck et al.

(10) Patent No.: US 12,330,357 B2
(45) Date of Patent: Jun. 17, 2025

(54) HOT RUNNER SYSTEM (71) Applicant: MOLD-MASTERS (2007) LIMITED, Ontario (CA)

(72) Inventors: Ralf Schunck, Pfinztal (DE); Kenneth Jacob, Tunkhannock, PA (US)

(73) Assignee: MOLD-MASTERS (2007) LIMITED, Ontario (CA)

( * ) Notice: Subject to any disclaimer, the term of this patent is extended or adjusted under 35 U.S.C. 154(b) by 285 days.

(21) Appl. No.: 18/327,576

(22) Filed: Jun. 1, 2023

(65) Prior Publication Data

US 2023/0321880 A1 Oct. 12, 2023

Related U.S. Application Data

(63) Continuation of application No. PCT/US2021/061731, filed on Dec. 3, 2021.

(60) Provisional application No. 63/121,294, filed on Dec. 4, 2020.

(51) Int. Cl.
*B29C 43/20* (2006.01)
*B29C 45/27* (2006.01)

(52) U.S. Cl.
CPC ...... *B29C 45/2725* (2013.01); *B29C 45/2738* (2013.01); *B29C 2045/2759* (2013.01)

(58) Field of Classification Search
CPC ..... B25C 45/20; B25C 45/27; B25C 45/2725; B25C 45/2729; B25C 45/273; B25C 45/2738; B29C 2045/2759
See application file for complete search history.

(56) References Cited

U.S. PATENT DOCUMENTS

| 5,894,025 A | 4/1999 | Lee et al. |
| 2001/0022321 A1* | 9/2001 | Bouti ................. B29C 45/2806 239/128 |
| 2008/0292746 A1 | 11/2008 | Olaru et al. |

(Continued)

FOREIGN PATENT DOCUMENTS

DE 2160535 A1 6/1973

OTHER PUBLICATIONS

International Search Report and Written Opinion for Application No. PCT/US2021/061731 mailed Feb. 18, 2022, 8 pages.

*Primary Examiner* — Thu Khanh T. Nguyen
(74) *Attorney, Agent, or Firm* — DINSMORE & SHOHL LLP (57) ABSTRACT

A hot runner system includes a manifold having a heater and a manifold channel network extending between a manifold inlet and a plurality of manifold outlets for distributing a molten plastic. A nozzle seated against the manifold and received in a respective manifold outlet has an extension portion received in the respective manifold outlet, a body portion projecting downstream from the extension portion, and a nozzle channel extending through the extension portion and the body portion. The hot runner system further includes a nozzle support seated against the nozzle, the nozzle support including an upstream nozzle support and a downstream nozzle support, the downstream nozzle support is discrete from and in slidable contact with the upstream nozzle support, and the downstream nozzle support having a looser fit with the body portion of the nozzle than that of the upstream nozzle support's fit with the body portion of the nozzle.

20 Claims, 11 Drawing Sheets

(56) References Cited

U.S. PATENT DOCUMENTS

2014/0127348 A1    5/2014  Baumann et al.
2020/0290252 A1*  9/2020  Bosonetto ........... B29C 45/2725
2020/0331182 A1  10/2020  Bajwa et al.

* cited by examiner

HOT RUNNER SYSTEM

CROSS-REFERENCE TO RELATED APPLICATION

This application claims priority to PCT Application No. PCT/US2021/061731, filed Dec. 3, 2021, for "HOT RUNNER SYSTEM," which claims the benefit of U.S. Provisional Patent Application No. 63/121,294, filed on Dec. 4, 2020, for "HOT RUNNER SYSTEM," both of which are hereby incorporated by reference in their entirety including the drawings.

TECHNICAL FIELD

The present application relates to a hot runner system, and in particular, to a hot runner system having a plurality of nozzles laterally fixed to a manifold.

BACKGROUND

Hot runner systems having particularly close-pitch nozzle spacing and/or hot runner systems intended for micro molding applications pose unique challenges. For example, in hot runner systems having a face seal between the manifold and nozzles, the nozzles typically include an insulating collar at their upstream ends spaced apart from the nozzle body. The collar supports the nozzle against tipping force created by the manifold sliding against the nozzle; however, the diameter of the collar increases the minimum space between adjacent nozzles more than may be allowable for a particular molding application. Other hot runner systems have nozzles that are partially received in a manifold and fixed thereto so as to move with the manifold as it grows when heated. In this configuration, as the manifold grows, the nozzles are subjected to side loading. Such hot runner systems are relatively large to have sufficient strength to accommodate side loading but are not suited to close-pitch and/or micro molding applications. In some molding applications, such as parts suited for multiple gates and well-plates used for scientific testing and analysis, the pitch spacing between ideal gate locations on the part is dictated by an industry standard which can be too small to accommodate a traditionally heated hot runner nozzle.

SUMMARY

An aspect of the present application provides a hot runner system comprising: a manifold having a heater for maintaining the manifold at a suitable processing temperature and a manifold channel network extending between a manifold inlet and a plurality of manifold outlets, the manifold channel network for distributing a molten plastic from the manifold inlet to the plurality of manifold outlets; a nozzle seated against the manifold and received in a respective manifold outlet, the nozzle having an extension portion received in the respective manifold outlet and in conductive thermal communication with the manifold, a body portion projecting downstream from the extension portion, and a nozzle channel extending through the extension portion and the body portion; and a nozzle support seated against the nozzle and in which the body portion of the nozzle is received, the nozzle support including an upstream nozzle support and a downstream nozzle support, the downstream nozzle support is discrete from and in slidable contact with the upstream nozzle support, and the downstream nozzle support having a looser fit with the body portion of the nozzle than that of the upstream nozzle support's fit with the body portion of the nozzle.

The upstream nozzle support can include a bore which is rigidly aligned with a longitudinal axis of the nozzle.

The extension portion can be laterally fixed within the respective manifold outlet.

The extension portion can include external threads that mate with internal threads formed in the respective manifold outlet.

The extension portion can be laterally fixed within the manifold outlet via a transition fit.

The nozzle can include a flange between the extension portion and the body portion; and the upstream nozzle support includes a collar that surrounds the flange.

The flange can include an upstream facing surface; and the collar is sized so that the upstream facing surface is upstream of the collar.

The downstream nozzle support can include a flange that includes an upstream facing surface; and the upstream nozzle support includes a downstream facing surface that can slide against the upstream facing surface of the flange of the downstream nozzle support, as the manifold is heated.

The downstream facing surface of the upstream nozzle support can include a groove.

The upstream facing surface of the flange of the downstream nozzle support can include a groove.

The upper nozzle support can include internal threads that mate with external threads formed on the body portion of the nozzle.

The hot runner system can further comprise a bracing component in which the nozzle support is received; and the flange of the downstream nozzle support seats against the bracing component.

The downstream nozzle support can be laterally fixed to the bracing component by a mating engagement between an outer surface of the downstream nozzle support and a bore defined by the bracing component.

The downstream nozzle support can include a tubular body and a ridge extending circumferentially around the tubular body.

The downstream nozzle support can include an another ridge, axially spaced from the ridge, extending circumferentially around the tubular body, at least one of the ridge and the another ridge is sized to form a fluid seal with the bore of the bracing component.

The manifold can include a first manifold and a second manifold releasably coupled to the first manifold, the first manifold including a first heater and a first manifold channel network extends between the manifold inlet and a plurality of first manifold outlets, the second manifold including a second heater and second manifold channel network extending between a plurality of second manifold outlets and the manifold outlet, each of the second manifold is in fluid communication with a respective one of first manifold outlets, the manifold channel network includes the first manifold and the second manifold.

The hot runner system can further comprise a plurality of manifold supports, the manifold and the nozzle are sandwiched between the nozzle supports and the manifold supports.

The manifold support can include a plurality of biasing members that are compressed between the manifold and a mold plate, the mold plate partially defining an enclosure in which the hot runner system is received.

Each of the plurality of manifold supports can include a pillar on which the biasing members are stacked.

The manifold support can include a resilient member and an insulating member, the resilient member is seated against the manifold and the insulating member is seated against the resilient member.

DETAILED DESCRIPTION

In the following description, "downstream" is used with reference to the general direction of molding material flow from an injection unit to a mold gate of a mold cavity of an injection molding apparatus and to the order of components, or features thereof, through which the molding material flows from an inlet of the injection molding apparatus to the mold gate. "Upstream" is used with reference to the opposite direction. In the following description, reference numbers followed by the letter "S" refer to components or features thereof which are shown schematically. Further, there is no intention to be bound by any expressed or implied theory presented in the preceding technical field, background, summary, or the following detailed description.

Figure 1:
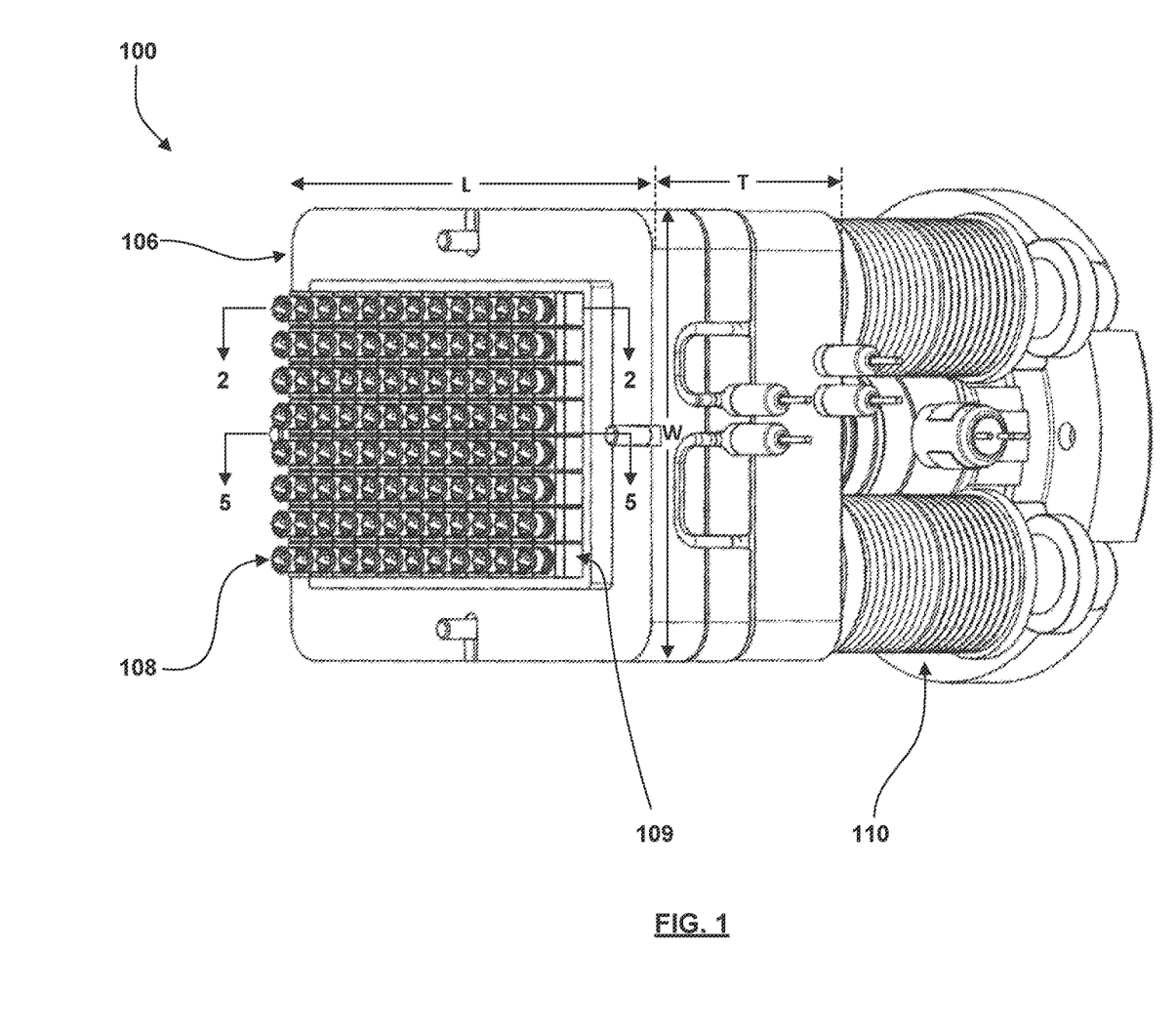
FIG. 1 is a perspective view of a downstream side of a hot runner system in accordance with an embodiment of the present application.
Figure 2:
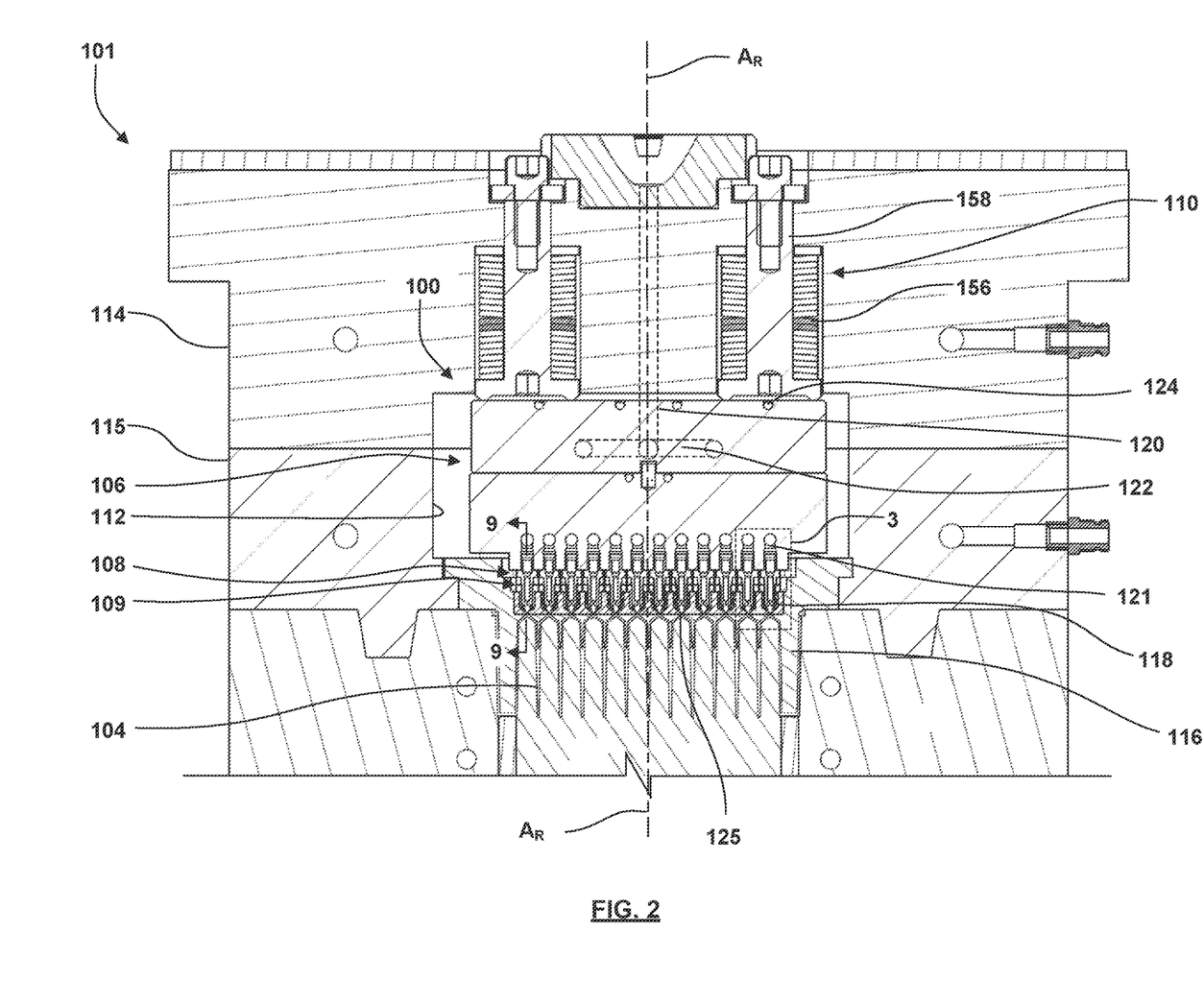
FIG. 2 is a sectional view of the hot runner system taken along line 2-2 of FIG. 1 and shown installed in an injection molding apparatus.

Referring to FIGS. 1 and 2 in which FIG. 1 is a is a perspective view of a downstream side of a hot runner system 100 in accordance with an embodiment of the present application, and FIG. 2 is a sectional view of hot runner system 100 taken along line 2-2 of FIG. 1 and shown installed in an injection molding apparatus 101. Hot runner system 100 delivers molding material, received from a source to a mold cavity 104 (see FIG. 3) which defines the shape of a molded article (not shown) produced in injection molding apparatus 101. Hot runner system 100 is suitable for delivering molding material to one or more than one mold cavity. Hot runner system 100 includes a manifold 106 and a plurality of nozzles 108 against which manifold 106 is seated. In operation, molding material flows through manifold 106 and nozzle 108 to mold cavity 104. Hot runner system 100 further includes a plurality of nozzle supports 109 and a plurality of manifold supports 110 between which manifold 106 and nozzles 108 are sandwiched together.

Hot runner system 100 is received in an enclosure 112 which is defined by a first mold plate 114 and a second mold plate 115 of injection molding apparatus 101. Injection molding apparatus 101 further includes a cavity insert 116 which is fixed within second mold plate 115 and a bracing component 118 which is fixed within cavity insert 116 and in which nozzle supports 109 are received. Although cavity insert 116 and bracing component 118 are shown as discrete components, cavity insert 116 and bracing component 118 can also be formed as a unitary component (not shown).

Continuing with FIGS. 1 and 2, manifold 106 is anchored to injection molding apparatus 101, by, for example, slot/dowel engagement between manifold 106 and cavity insert 116, to define a thermal expansion reference axis $A_R$ from which manifold 106 expands along its length L and width W. Manifold 106 includes a manifold inlet 120 which receives molding material from a source (e.g., a molding machine) and a plurality of manifold outlets 121 defined by respective outlet bores 123. Manifold outlets 121 deliver molding material to respective nozzles 108 which are partially received in outlet bores 123. Extending between manifold inlet 120 and manifold outlets 121, manifold 106 includes a manifold channel network 122 (partially shown) which is arranged to distribute molding material from manifold inlet 120 to manifold outlets 121. In the illustrated embodiments shown herein manifold outlets 121 are arranged in an array, e.g., a rectangular array; however, other configurations are contemplated. Manifold 106 further includes at least one manifold heater 124 for maintaining manifold 106 at a suitable processing temperature. Each nozzle 108 is without a respective heater and its associated wires and terminal connectors and is instead indirectly heated by way of manifold heater 124. That is, nozzle 108 is heated by way of heat transfer from manifold 106 to nozzle 108 at locations where manifold 106 and nozzle 108 are in contact with each other. Since nozzle 108 is heated by conductive heat transfer from manifold 106, nozzle 108 is made from a material having good thermal conductivity characteristics, examples of such materials include beryllium copper or a beryllium-free copper alloy, which are also known to have a high coefficient of thermal expansion. Manifold 106 is typically made from a durable material, typically a tool steel such as H13, which has lower thermal conductivity and thermal expansion properties than that of the material from which nozzle 108 is made.

Figure 3:
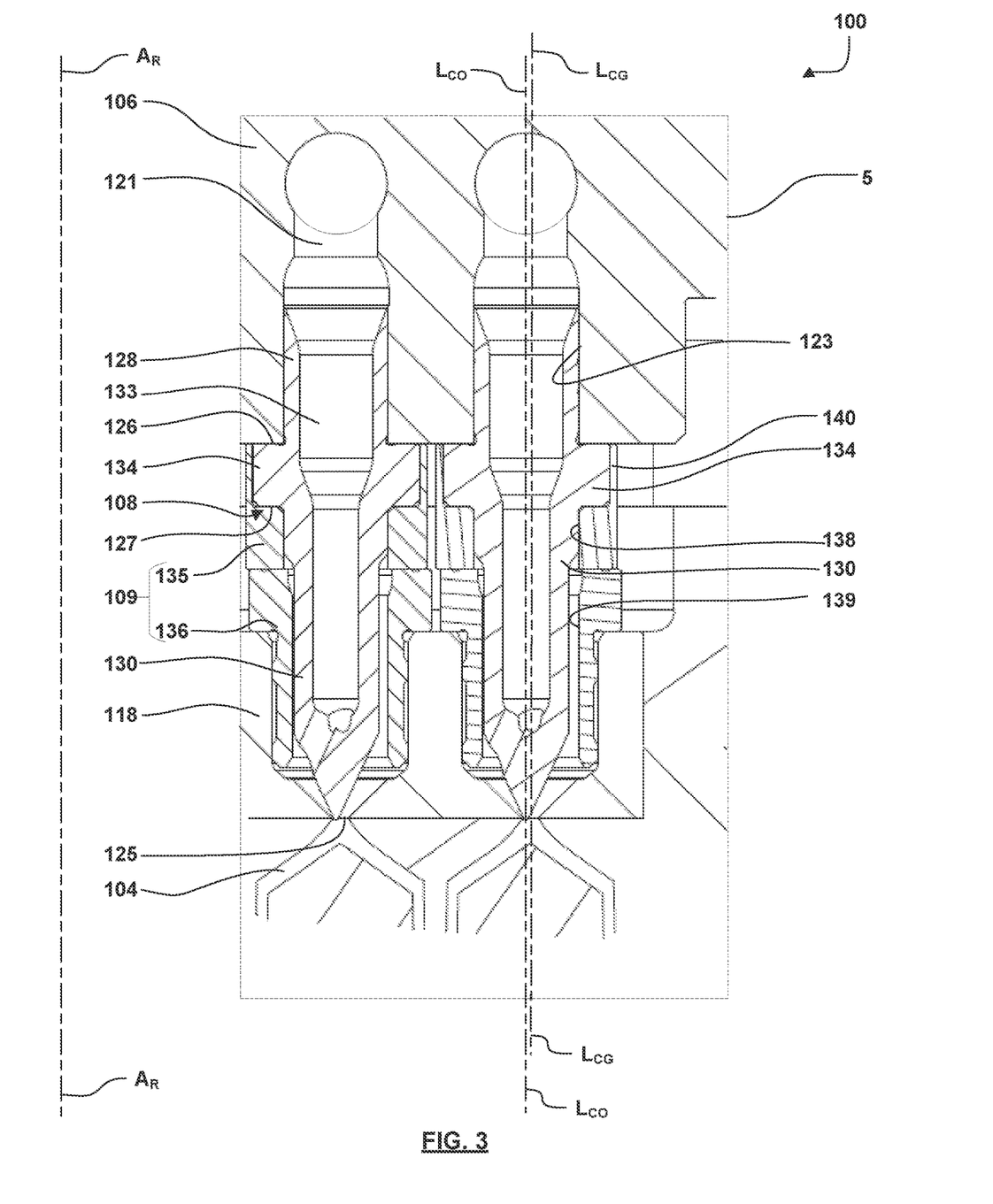
FIG. 3 is an enlarged view of a portion 3 of FIG. 2 showing the hot runner system in an unheated condition.
Figure 4:
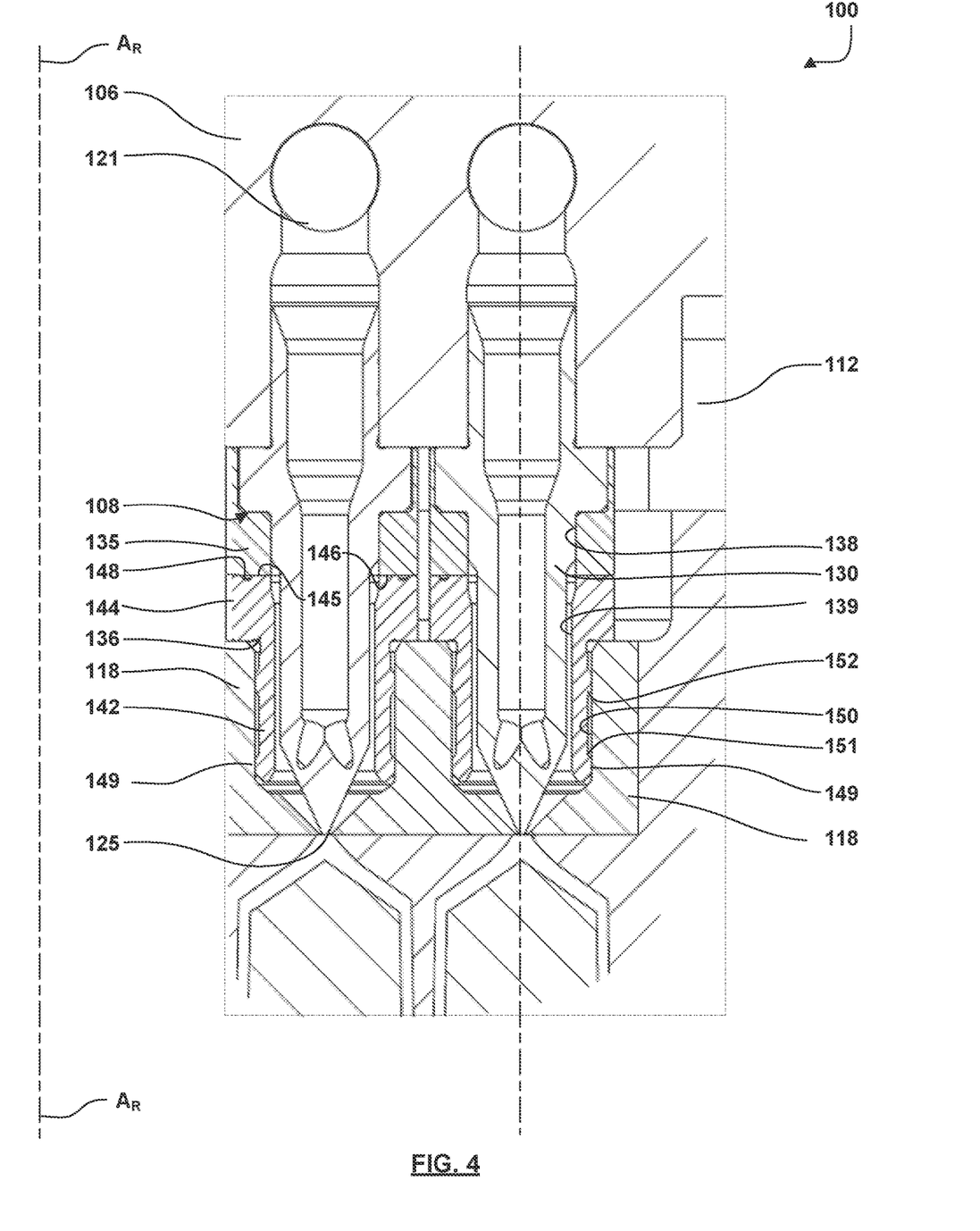
FIG. 4 is the enlarged view of portion 3 of FIG. 2 showing hot runner system in a heated condition.

Continuing with FIGS. 1 and 2, and referring to FIGS. 3 and 4 in which FIG. 3 is an enlarged view of a portion 3 of FIG. 2 showing hot runner system 100 in an unheated condition and FIG. 4 is the enlarged view of portion 3 of FIG. 2 showing hot runner system 100 in a heated condition. Referring to FIG. 3, when manifold 106 is unheated, a centerline $L_{CO}$ of outlet bore 123 is laterally offset from a centerline $L_{CG}$ of a mold gate 125 in a direction towards reference axis $A_R$. As manifold 106 is heated, manifold outlet 121 moves laterally towards gate axis $A_G$. Once manifold 106 is heated to processing temperature, manifold outlet 121 and mold gate 125 are less offset than when manifold 106 is unheated. Ideally, when manifold 106 is heated to processing temperature, manifold outlet 121 and mold gate 125 are concentric as is shown in FIG. 4.

Continuing with FIGS. 3 and 4, nozzle 108 includes an upstream facing surface 126 which is seated against manifold 106 and a downstream facing surface 127 which is seated against nozzle support 109. Nozzle 108 further includes an extension portion 128, a body portion 130 which projects downstream from extension portion 128, and a nozzle channel 133 that extends through extension portion 128 and body portion 130 to deliver molding material, received from manifold outlet 121, to mold cavity 104. Nozzle support 109 includes two discrete components: an upstream nozzle support 135 and a downstream nozzle support 136 which is seated against and laterally fixed to bracing component 118. Upstream nozzle support 135 and downstream nozzle support 136 include respective bores 138, 139 which extend axially therethrough. Nozzle 108, upstream nozzle support 135, and downstream nozzle support 136 are sandwiched together between manifold 106 and bracing component 118.

Extension portion 128 is laterally fixed within outlet bore 123, and body portion 130 is received in bore 138 in upstream nozzle support 135 and extends into bore 139 in downstream nozzle support 136. An example of a suitable fit between extension portion 128 and outlet bore 123 includes a transition fit such as a slide fit or a light press fit (that is, extension portion 128 can be laterally fixed within outlet bore 123 via a transition fit); a closely sized fit which promotes a fluid seal between outlet bore 123 and extension portion 128 which, due to the different thermal expansion characteristics of manifold 106 and nozzle 108, increases a sealing force therebetween as nozzle 108 is heated. An example of a suitable fit between body portion 130 bore 138 includes, an interference fit which fixes upstream nozzle support 135 to body portion 130. As manifold 106 is heated, nozzle 108 and upstream nozzle support 135 attached thereto move laterally away from reference axis $A_R$ during which time upstream nozzle support 135 slides against downstream nozzle support 136 and body portion 130 moves laterally within bore 139 in downstream nozzle support 136. Bore 139 is sized to permit nozzle 108 to move laterally therein without downstream nozzle support 136 impinging body portion 130, which along with nozzle 108 and nozzle support 109 being sandwiched between manifold 106 and bracing component 118 allows nozzle 108 to move laterally with manifold 106 while limiting or preventing nozzle 108 from being subjected to undue tipping force created by friction from the sliding between upstream nozzle support 135 and downstream nozzle support 136. That is, downstream nozzle support 136 has a looser fit with body portion 130 of nozzle 108 than that of upstream nozzle support's 135 fit with body portion 130 of nozzle 108.

To limit heat loss from manifold 106 to bracing component 118 via nozzle support 109, nozzle support 109 is made from a material having low thermal conductivity characteristics in comparison to the thermal conductivity characteristics of nozzle 108, an example of such a material includes a titanium alloy such as Grade 5 Titanium.

In the illustrated embodiment of FIGS. 1-4, upstream and downstream facing surfaces 126, 127 of nozzle 108 are oppositely facing surfaces of a flange 134 which is located between extension portion 128 and body portion 130.

Continuing with FIG. 3, upstream nozzle support 135 includes a collar 140 which surrounds flange 134. Collar 140 helps with handling an assembled nozzle 108 and upstream nozzle support 135, for example, when inserting nozzle 108 into outlet bore 123. Collar 140 is sized so that upstream facing surface 126 is above collar 140 (i.e., upstream facing surface 126 is upstream of collar 140) which promotes contact between manifold 106 and nozzle 108, and thus heat transfer from manifold 106 to nozzle 108. As the distance between upstream facing surface 126 and downstream facing surface 127 increases due to heat input to nozzle 108, thermal expansion force promotes a face seal between upstream facing surface 126 manifold 106 which reduces the likelihood of molding material egressing from manifold outlet 121 through the interface between extension portion 128 and outlet bore 123.

Referring now to FIG. 4, in the illustrated embodiment of FIGS. 1-4, downstream nozzle support 136 includes a tubular body 142 and a flange 144. Flange 144 seats against bracing component 118 and includes an upstream facing surface 145 against which a downstream facing surface 146 of upstream nozzle support 135 slides as manifold 106 is heated. In the in the illustrated embodiment of FIGS. 1-4, upstream facing surface 145 includes an annular groove 148. Groove 148 reduces the surface contact between upstream and downstream nozzle supports 135, 136 which may reduce sliding friction between upstream and downstream nozzle supports 135, 136. Further, should molding material ingress between upstream and downstream facing surfaces 145, 146, groove 148 may also serve as a basin in which migrated molding material collects, which helps protect against egress of molding material into enclosure 112. Although groove 148 is shown in upstream facing surface 145, groove 148 can also be formed in downstream facing surface 146.

Continuing with FIG. 4 downstream nozzle support 136 is laterally fixed to bracing component 118 by a mating engagement between an outer surface 149 of downstream nozzle support 136 and a bore 150 in bracing component 118. In the illustrated embodiment of FIGS. 1-4, outer surface 149 includes respective outer surfaces of axially spaced apart first and second ridges 151, 152 which extend circumferentially around tubular body 142. At least one of first ridge 151 and second ridge 152 is sized to form a fluid seal with bore 150 so as to limit or prevent backflow of molding material into enclosure 112. First and second ridges 151, 152 help to mitigate tipping force acting on downstream nozzle support 136, which may compromise the fluid seal between one of ridges 151, 152 and bore 150.

Figure 5:
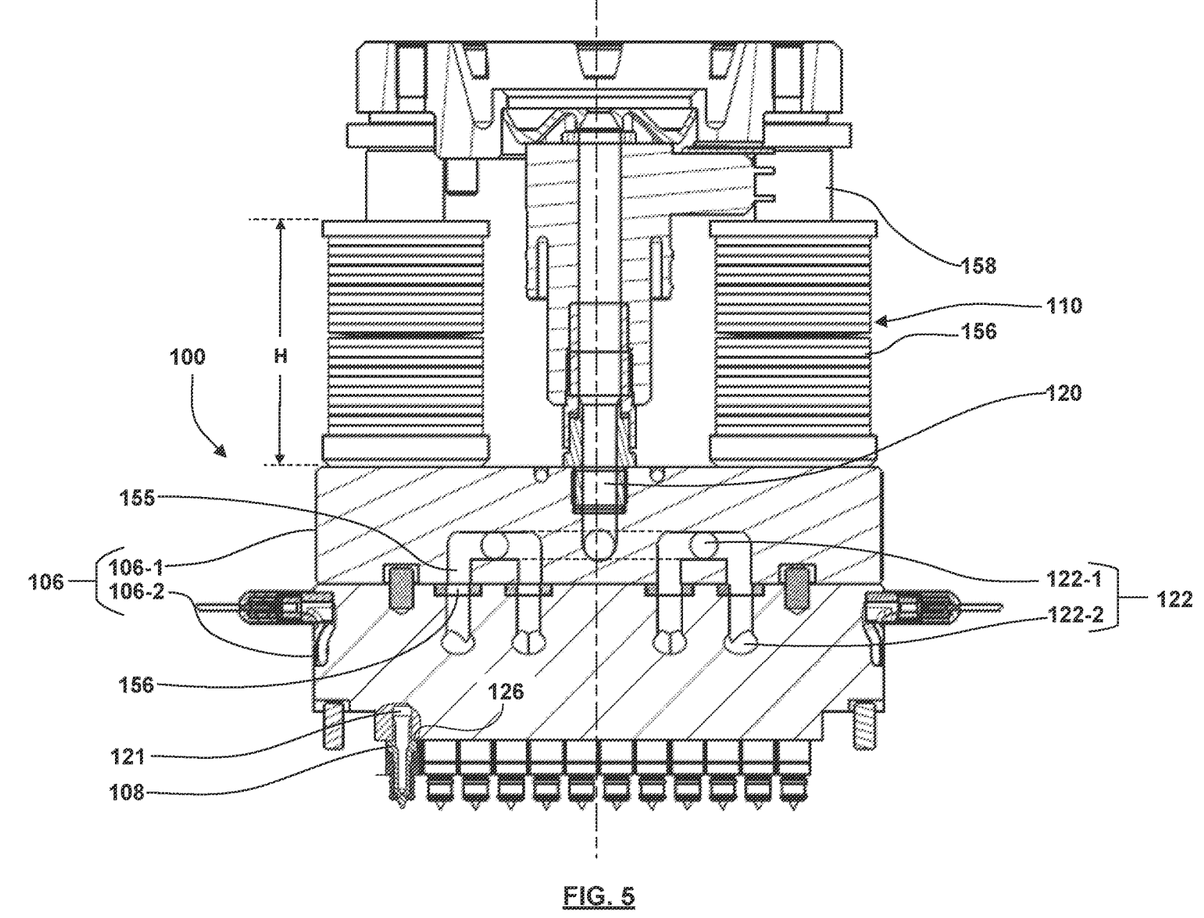
FIG. 5 is a sectional view of the hot runner system taken along line 5-5 of FIG. 1.
Figure 6:
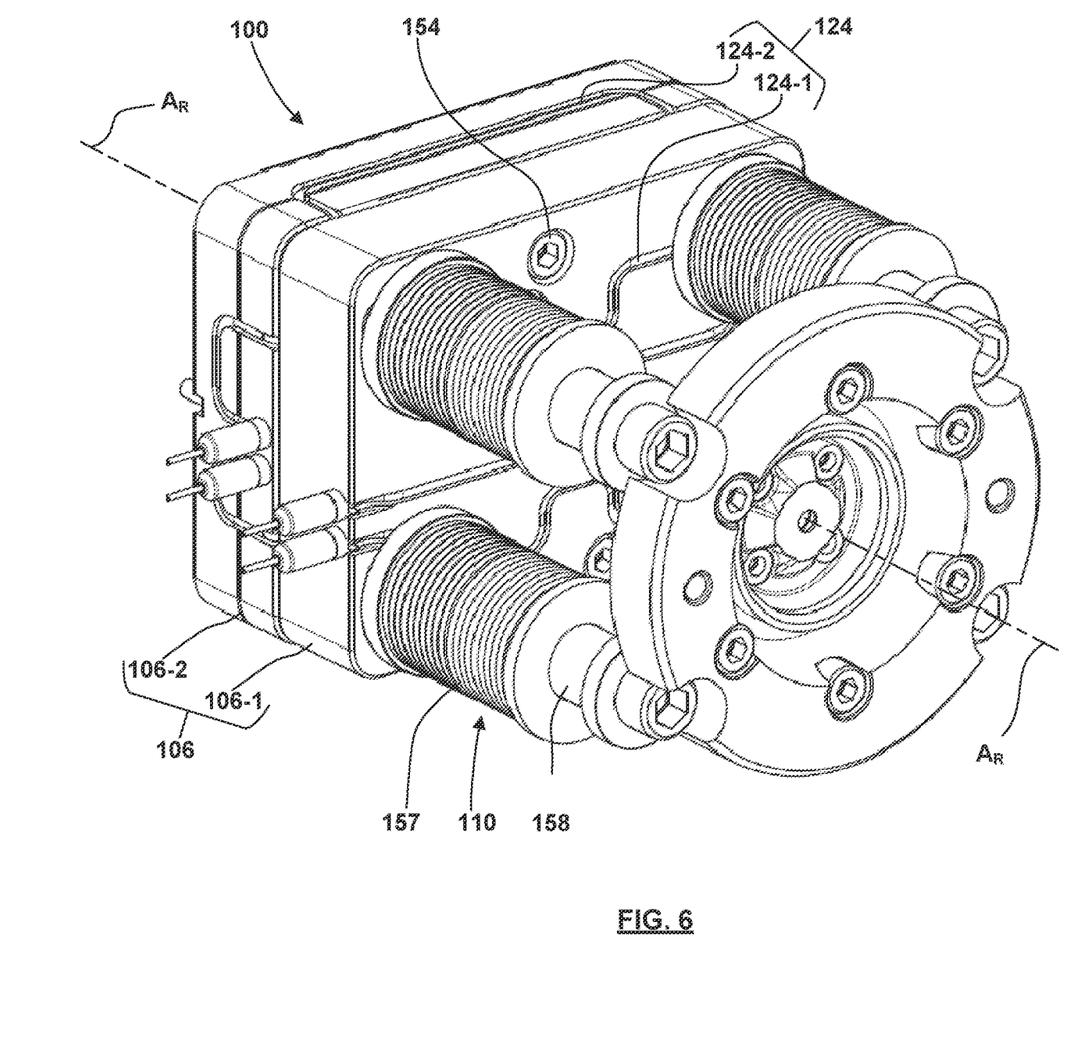
FIG. 6 is a perspective view of an upstream side of the hot runner system.

Referring now to FIGS. 5 and 6, in which FIG. 5 is a is a sectional view of hot runner system 100 taken along line 5-5 of FIG. 1 and FIG. 6 is a perspective view of an upstream side of hot runner system 100. FIG. 5 illustrates details of manifold 106 according to the embodiments of FIGS. 1-4. Manifold 106 includes a first manifold 106-1 releasably coupled to a second manifold 106-2 by, for example a plurality of fasteners 154 (see FIG. 6). First manifold 106-1 includes a first heater 124-1 (see FIG. 6) and a first manifold channel network 122-1 (shown partially in FIG. 5) which extends between manifold inlet 120 and a plurality of first manifold outlets 155. Second manifold 106-2 includes a second heater 124-2 (see FIG. 6) and a second manifold channel network 122-2 (shown partially in FIG. 5) that extends between a plurality of second manifold inlets 156 and manifold outlets 121 (one of which is shown in FIG. 5). Each second manifold inlet 156 is in fluid communication with a respective first manifold outlet 155. Making manifold 106 from first and second manifolds 106-1, 106-2, each having a respective heater, allows greater thermal control of molding material flowing through manifold 106, and also allows for greater heat input to nozzles 108.

Continuing with FIGS. 5 and 6, and referring to FIG. 2, in the illustrated embodiment of FIGS. 1-4, manifold support 110 includes a plurality of biasing members 157 that are compressed between manifold 106 and first mold plate 114. Biasing members 157 press manifold 106 against nozzle 108 which encourages heat transfer from manifold 106 to nozzle 108 and promotes a fluid seal surrounding extension portion 128, between upstream facing surface 126 and manifold 106. Manifold support 110 further includes a pillar 158, on which of biasing members 157 are stacked. Pillar 158 is attached to first mold plate 114 so that biasing members 157 are also coupled to first mold plate 114. With this configuration, when separating first and second mold plates 114, 115, for example, to service hot runner system 100, biasing members 157 and pillar 158 remain attached to first mold plate 115, readily allowing to access manifold 106.

Figure 7:
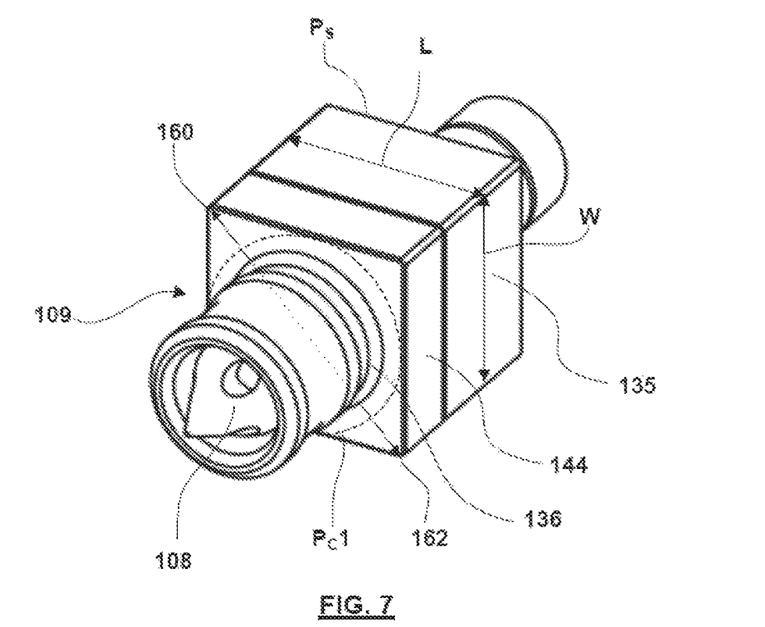
FIG. 7 is a perspective view of a nozzle and a nozzle support of the hot runner system according to an embodiment of the present application.

Referring now to FIG. 7, which is a perspective view of nozzle 108 and nozzle support 109 isolated from of hot runner system 100 of FIGS. 1-4. In the illustrated embodiment of FIGS. 1-4, upstream nozzle support 135 and flange 144 of downstream nozzle support 136 have a square profile $P_S$, which provides greater surface contact and support against tipping force than a nozzle support (not shown) having a circular profile $P_C1$ (shown in phantom) with a diameter equal to a length L/width W of square profile $P_S$.

Figure 8:
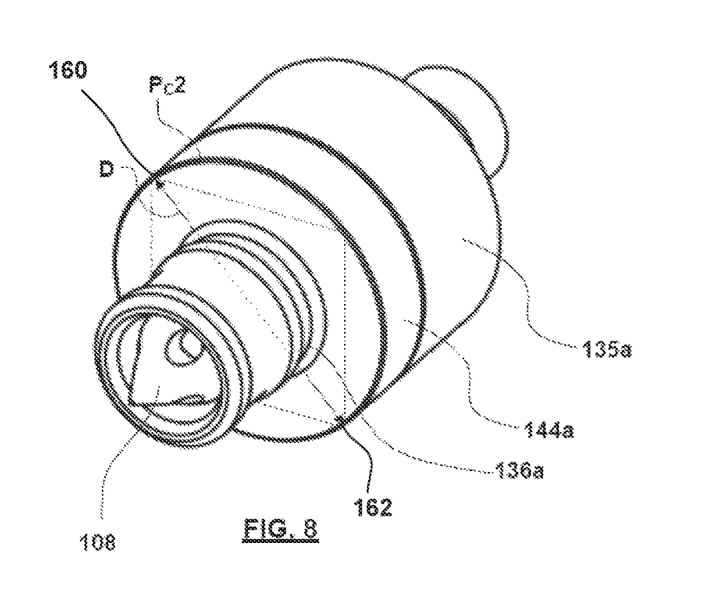
FIG. 8 is a perspective view of a nozzle having a nozzle support in accordance with another embodiment of the present application.

Referring now to FIG. 8, which is a perspective view of nozzle 108 installed in a nozzle support 109a in accordance with another embodiment of the present application. An upstream nozzle support 135a and a flange 144a of a downstream nozzle support 136a have a circular profile $P_C2$, with a diameter D that is substantially equal to the length L between diagonally opposite corners 160, 162 of nozzle support 109 shown in FIG. 8. This configuration improves support of nozzle 108 against tipping force as upstream nozzle support 135a slides across downstream nozzle support 136a.

Figure 9:
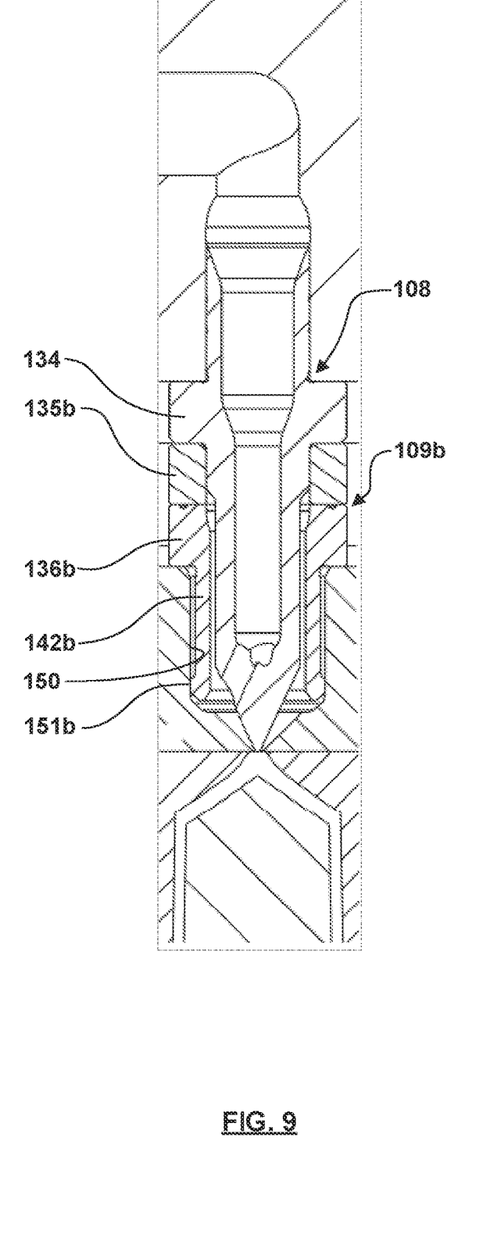
FIG. 9 is a sectional view of a portion of FIG. 2 taken along line 9-9, showing a nozzle having a nozzle support in accordance with yet another embodiment of the present application.

Referring now FIG. 9, which is a sectional view of a portion of FIG. 2 taken along line 9-9, showing nozzle 108 with a nozzle support 109b in accordance with yet another embodiment of the present application. Features and aspects of the current embodiment can be used accordingly with the other embodiments. Nozzle support 109b includes an upstream nozzle support 135b and a downstream nozzle support 136b. Upstream nozzle support 135b differs from upstream nozzle support 135 described with regard to FIG. 4 in that upstream nozzle support 135b is without a collar surrounding nozzle flange 134. This configuration may simplify manufacturing of upstream nozzle support 135b. Downstream nozzle support 136b differs from downstream nozzle support 136 described with regard to FIG. 4 in that downstream nozzle support 136b includes a single ridge 151b which extends circumferentially around a tubular portion 142b of downstream nozzle support 136b. Ridge 151b is sized to form a fluid seal with bore 150 to limit or prevent backflow of molding material into enclosure 112. Although ridge 151b is shown in the same location as ridge 151 in FIG. 4, ridge 151b can extend circumferentially around tubular portion 142b at any position along a length of tubular portion 142b.

Figure 10:
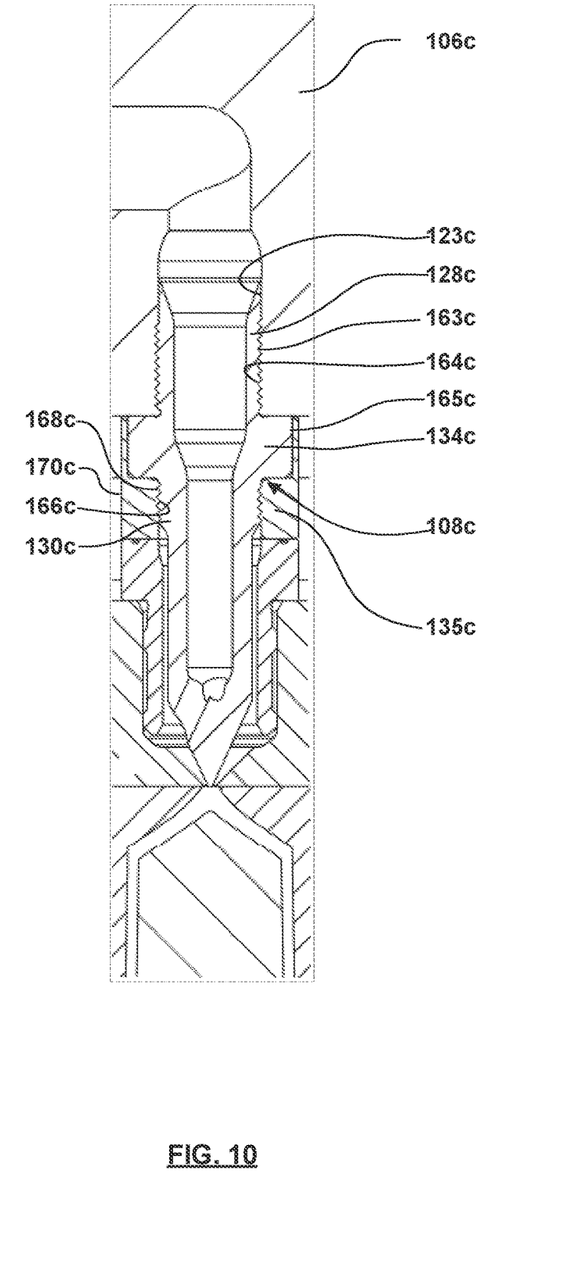
FIG. 10 is a sectional view of a portion of FIG. 2 taken along line 9-9, showing a manifold, a nozzle, and a nozzle support in accordance with yet another embodiment of the present application.

FIG. 10 is a sectional view of a portion of FIG. 2 taken along line 9-9, showing a manifold 106c, a nozzle 108c, and an upstream nozzle support 135c in accordance with yet another embodiment of the present application. Features and aspects of the current embodiment can be used accordingly with the other embodiments. Nozzle 108c differs from nozzle 108 described with regard to FIG. 4 in that an extension portion 128c of nozzle 108c includes external threads 163c that mate with internal threads 164c formed in an outlet bore 123c of manifold 106c to couple nozzle 108c to manifold 106c. In this configuration a periphery 165c of flange 134c of nozzle may include an external screw-drive such as a 12-point drive to facilitate coupling and decoupling nozzle 108c and manifold 106c. Continuing with FIG. 10 upstream nozzle support 135c differs from upstream nozzle support 135 discussed with regard to FIG. 4 in that upper nozzle support 135c includes internal threads 166c that mate with external threads 168c formed on a body portion 130c of nozzle 108c to laterally fix upstream nozzle support 135c to nozzle 108c. In this configuration a periphery 170c of upstream nozzle support 135c may include an external screw-drive such as a 12-point drive to facilitate coupling and decoupling upstream nozzle support 135c and nozzle 108c.

Figure 11:
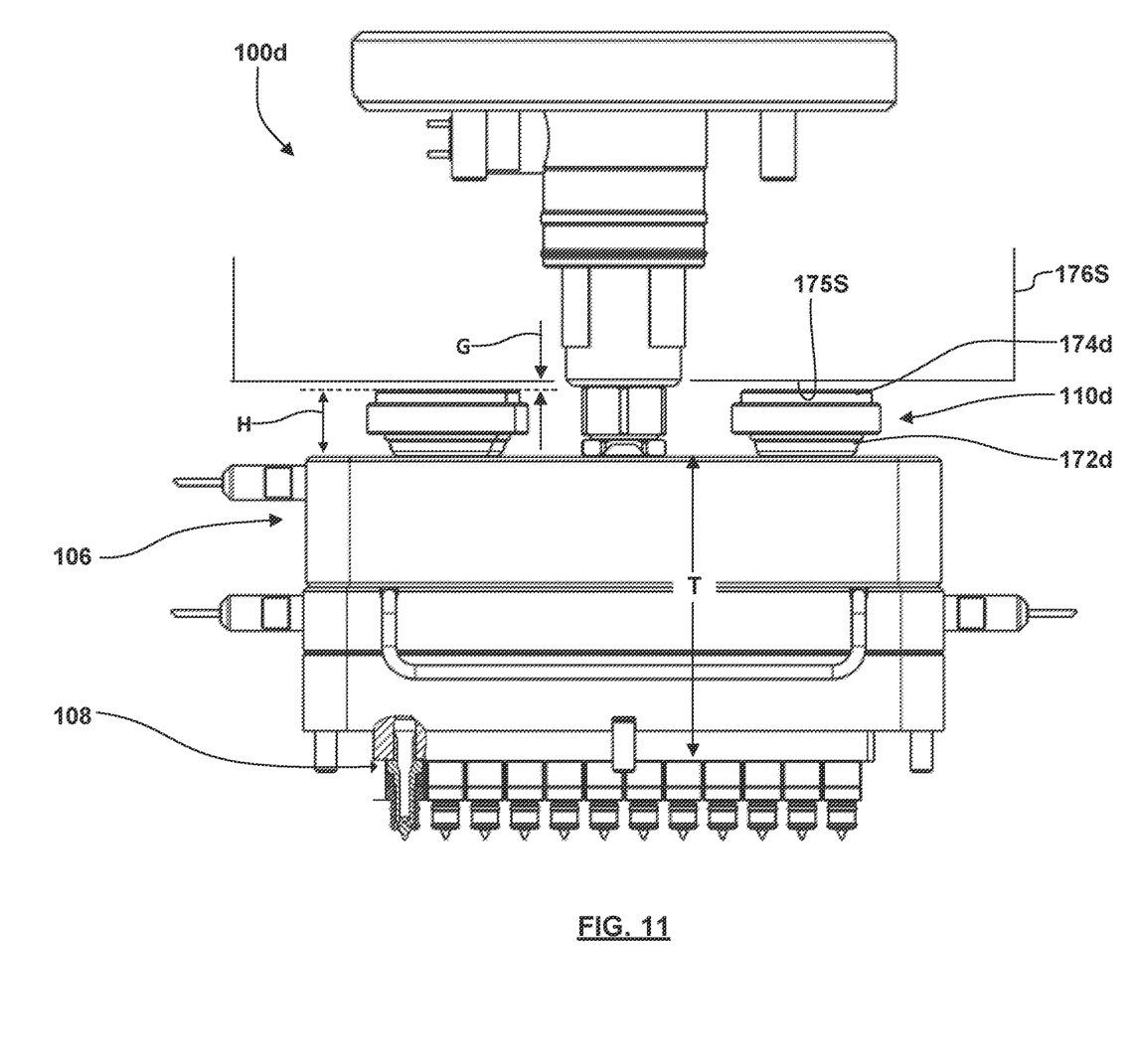
FIG. 11 is a side view of a hot runner system having a manifold support in accordance with yet another embodiment of the present application.

FIG. 11 is a side view of hot runner system 100d having a manifold support 110d in accordance with yet another embodiment of the present application. Features and aspects of the current embodiment can be used accordingly with the other embodiments. Manifold support 110d differs from manifold support 110 described with regard to FIGS. 2-4 in that manifold support 110d is provided in the form of a resilient member 172d and an insulating member 174d. A stack-height H of manifold support 110d is less than a stack height H of manifold support 110 (see FIG. 5). Resilient member 172d is seated against manifold 106 and insulating member 174d is seated against resilient member 172d. Resilient member 172d is made from a hardened metallic material, for example H13 tool steel, and is shaped to flex when compressed. Insulating member 174d is made from a material, for example, a ceramic material, which is less thermally conductive than a material from which resilient member 172d is made. Manifold support 110d is sized so that when manifold 106 is unheated, there is a gap G between insulating member 174d and a downstream facing surface 175S of a mold plate 176S. When manifold 106 is heated to an operational temperature, thermal expansion of manifold 106 across its thickness T eliminates gap G so that manifold support 110d is compressed against mold plate 176S, which pushes manifold 106 against nozzle 108. Since manifold 106 is spaced apart from mold plate 176S by insulating member 174d, manifold support 110 may be useful in applications where heat loss from manifold 106 through a manifold support is problematic, for example, processing a thermally sensitive resin.

Figure 12:
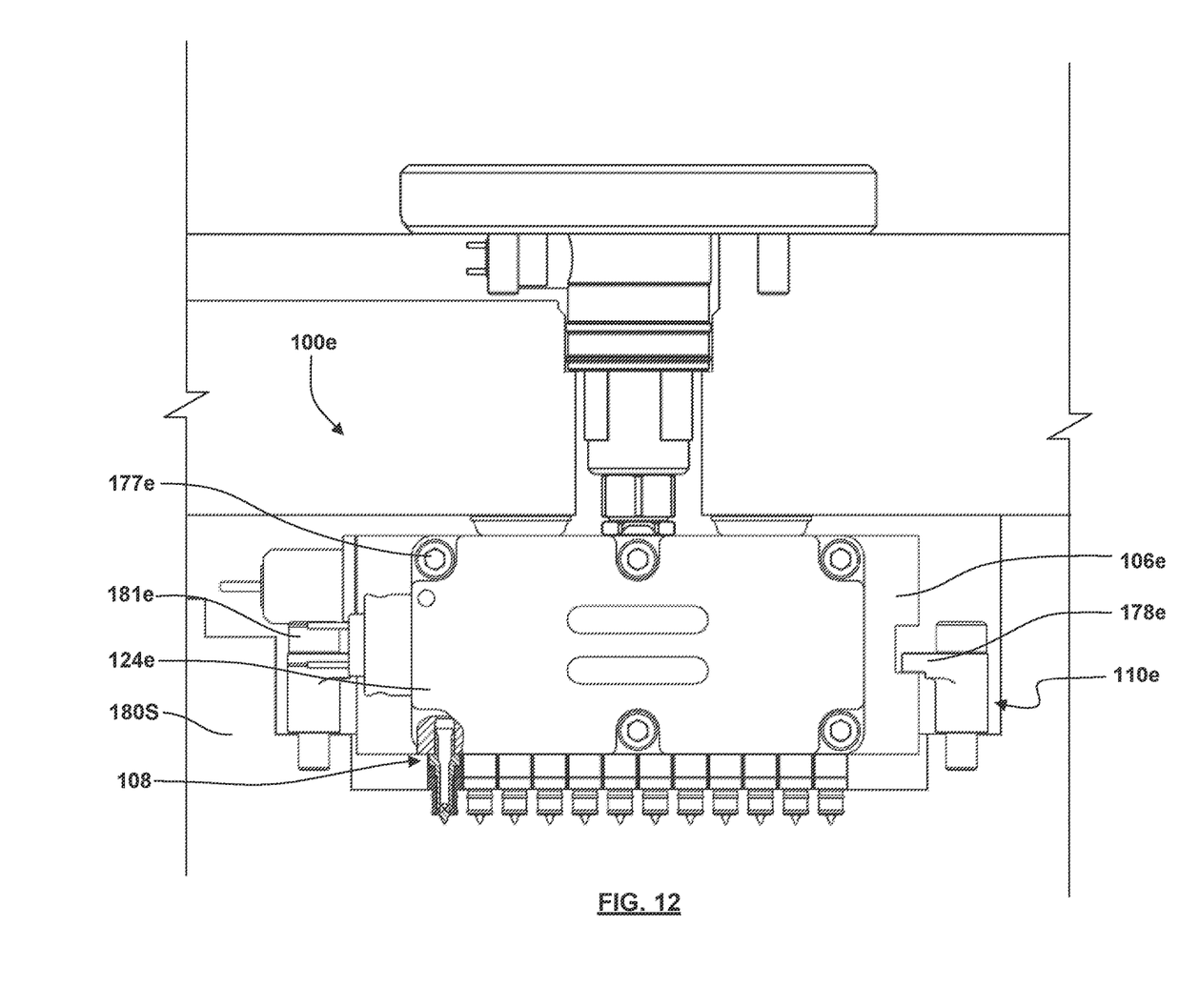
FIG. 12 is a side view of a hot runner system having a manifold, a manifold support and a manifold heater in accordance with yet another embodiment of the present application.

FIG. 12 is a side view of a hot runner system 100e having a manifold 106e, a manifold support 110e and a manifold heater 124e in accordance with yet another embodiment of the present application. Features and aspects of the current embodiment can be used accordingly with the other embodiments. Hot runner system 100e differs from hot runner system 100 described with regard to FIGS. 1-4 in that manifold 106e is a unitary structure which defines a melt channel network (not shown) therein. Manifold 106e is heated by the manifold heater 124e which is secured to a longitudinal side of manifold 106 by a plurality of fasteners 177e. The manifold heater 124e may be replaceable. Manifold support 110e is a plurality of L-shaped clamping members 178e which are secured to mold plate 180S by fasteners 181e to hold manifold 106 against nozzles 108.

Figure 13:
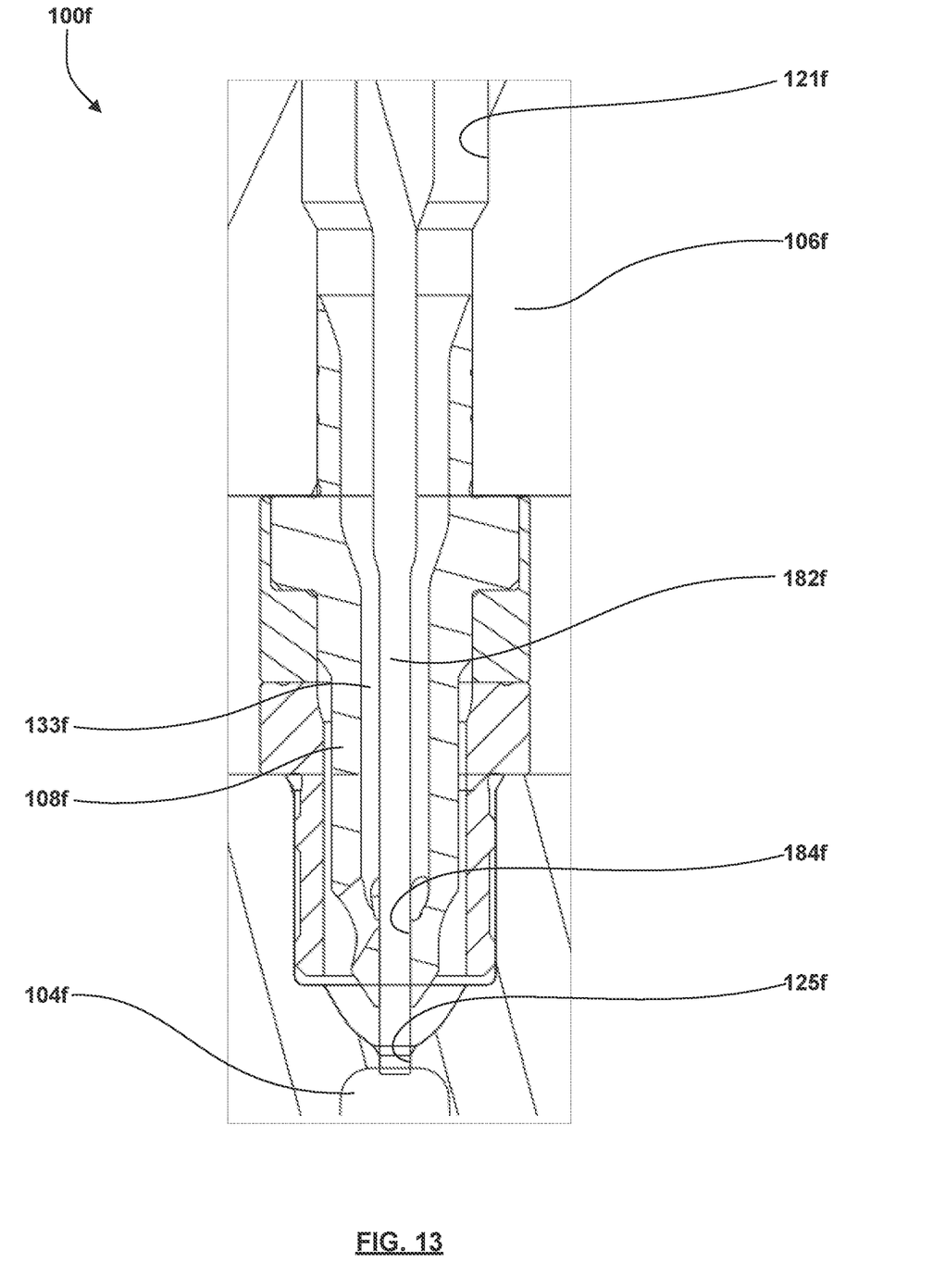
FIG. 13 is a sectional view of a portion of hot runner system, similar to portion 3 of FIG. 2, showing a hot runner system which is configured for valve-gating.

FIG. 13 is a sectional view of a portion of hot runner system, similar to portion 3 of FIG. 2, showing a hot runner system 100f in accordance with yet another embodiment of the present application. Features and aspects of the current embodiment can be used accordingly with the other embodiments. Hot runner system 100*f* differs from hot runner system 100 described with regard to FIGS. 1-4 in that hot runner system 100*f* is configured for valve-gating. Hot runner system 100*f* includes a valve pin 182*f* (partially shown) and a nozzle 108*f* having a longitudinally extending nozzle channel 133*f*. A valve pin bore 184*f* extends axially through nozzle 108*f* from nozzle channel 133*f*. Valve pin 182*f* extends through valve pin bore 184*f* to a mold gate 125*f* through which molding material is injected into a mold cavity 104*f*. Upstream from valve pin bore 184*f*, valve pin 182*f* extends through nozzle channel 133*f* and into a manifold outlet 121*f* of a manifold 106*f* (partially shown). Upstream from manifold outlet 121*f* valve pin 182*f* is coupled to an actuator (not shown) which translates valve pin 182*f* between a closed position, in which valve pin 182*f* blocks mold gate 125*f* to prevent molding material from entering mold cavity 104*f*, and an open position, in which valve pin 182*f* is spaced apart from mold gate 125*f* to permit molding material to enter mold cavity 104*f*. In FIG. 13, valve pin 182*f* is in the closed position.

While various embodiments have been described above, they are presented only as illustrations and examples, and not by way of limitation. Thus, the present application should not be limited by any of the above-described embodiments but should be defined only in accordance with the appended claims and their equivalents.

What is claimed is:

1. A hot runner system comprising:
a manifold having a heater for maintaining the manifold at a suitable processing temperature and a manifold channel network extending between a manifold inlet and a plurality of manifold outlets, the manifold channel network for distributing a molten plastic from the manifold inlet to the plurality of manifold outlets;
a nozzle seated against the manifold and received in a respective manifold outlet, the nozzle having
an extension portion received in the respective manifold outlet and in conductive thermal communication with the manifold,
a body portion projecting downstream from the extension portion, and
a nozzle channel extending through the extension portion and the body portion; and
a nozzle support seated against the nozzle and in which the body portion of the nozzle is received, the nozzle support including an upstream nozzle support and a downstream nozzle support, the downstream nozzle support is discrete from and in slidable contact with the upstream nozzle support, and the downstream nozzle support having a looser fit with the body portion of the nozzle than that of the upstream nozzle support's fit with the body portion of the nozzle.

2. The hot runner system of claim 1, wherein the upstream nozzle support includes a bore which is rigidly aligned with a longitudinal axis of the nozzle.

3. The hot runner system of claim 2, wherein the extension portion is laterally fixed within the respective manifold outlet.

4. The hot runner system of claim 3, wherein the extension portion includes external threads that mate with internal threads formed in the respective manifold outlet.

5. The hot runner system of claim 3, wherein the extension portion is laterally fixed within the respective manifold outlet via a transition fit.

6. The hot runner system of claim 2, wherein the nozzle includes a flange between the extension portion and the body portion, and the upstream nozzle support includes a collar that surrounds the flange.

7. The hot runner system of claim 6, wherein the flange includes an upstream facing surface, and the collar is sized so that the upstream facing surface is upstream of the collar.

8. The hot runner system of claim 7, wherein the downstream nozzle support includes a flange that includes an upstream facing surface, and the upstream nozzle support includes a downstream facing surface that can slide against the upstream facing surface of the flange of the downstream nozzle support, as the manifold is heated.

9. The hot runner system of claim 8, the downstream facing surface of the upstream nozzle support includes a groove.

10. The hot runner system of claim 8, the upstream facing surface of the flange of the downstream nozzle support includes a groove.

11. The hot runner system of claim 2, wherein the upstream nozzle support includes internal threads that mate with external threads formed on the body portion of the nozzle.

12. The hot runner system of claim 8, further comprising a bracing component in which the nozzle support is received, and the flange of the downstream nozzle support seats against the bracing component.

13. The hot runner system of claim 12, wherein the downstream nozzle support is laterally fixed to the bracing component by a mating engagement between an outer surface of the downstream nozzle support and a bore defined by the bracing component.

14. The hot runner system of claim 13, wherein the downstream nozzle support includes a tubular body and a ridge extending circumferentially around the tubular body.

15. The hot runner system of claim 14, wherein the downstream nozzle support includes an another ridge, axially spaced from the ridge, extending circumferentially around the tubular body, at least one of the ridge and the another ridge is sized to form a fluid seal with the bore of the bracing component.

16. The hot runner system of claim 1, wherein the manifold includes a first manifold and a second manifold releasably coupled to the first manifold, the first manifold including a first heater and a first manifold channel network extends between the manifold inlet and a plurality of first manifold outlets, the second manifold including a second heater and a second manifold channel network extending between a plurality of second manifold outlets and the respective manifold outlet, each of the second manifold is in fluid communication with a respective one of first manifold outlets, the manifold channel network includes the first manifold and the second manifold.

17. The hot runner system of claim 1 further comprising a plurality of manifold supports, the manifold and the nozzle are sandwiched between the nozzle support and the manifold supports.

18. The hot runner system of claim 17, wherein each of the plurality of manifold supports includes a plurality of biasing members that are compressed between the manifold and a mold plate, the mold plate partially defining an enclosure in which the hot runner system is received.

19. The hot runner system of claim 18, wherein each of the plurality of manifold supports include a pillar on which the biasing members are stacked.

20. The hot runner system of claim 17, wherein the manifold support includes a resilient member and an insulating member, the resilient member is seated against the manifold and the insulating member is seated against the resilient member.

* * * * *